March 3, 1953 K. V. McCULLOUGH ET AL 2,630,395

THERMOSETTING WOOD FILLER COMPOSITION

Filed June 6, 1947

INVENTORS
Kenneth V. McCullough
Lewis D. Maines
BY
*D.C. Harrison*
ATTORNEY

Patented Mar. 3, 1953

2,630,395

UNITED STATES PATENT OFFICE 2,630,395

THERMOSETTING WOOD FILLER COMPOSITION

Kenneth Vernon McCullough, Plainfield, and Lewis Donald Maines, Bloomfield, N. J., assignors, by mesne assignments, to Union Carbide and Carbon Corporation, a corporation of New York Application June 6, 1947, Serial No. 753,052

6 Claims. (Cl. 154—121)

This invention relates to pigment containing thermosetting filler compositions for filling the pores and grain of wood surfaces, particularly such furniture woods as mahogany, oak and walnut, and which compositions have good adherence both to the wood surface and to superimposed sealing and finish coatings containing thermosetting resins as a major vehicle component.

Coating compositions based on thermosetting resins such as phenol-aldehyde resins, urea-formaldehyde resins, melamine-formaldehyde resins have been previously proposed for coating wood surfaces to yield hard abrasion and solvent resistant finishes. By the addition of acidic hardening agents these compositions can be rapidly heat-converted to an infusible and insoluble condition at very moderate baking temperatures, for example, baking for one hour between 50° C. and 80° C. or they can be air dried to a satisfactory hardness within several hours or overnight. It is customary, however, before applying the sealing and finish coatings, to fill the pores and grain of wood surfaces with fillers consisting of highly pigmented compositions of drying oils, oleo-resinous varnishes, alkyd resins or mixtures of the foregoing. But it has been found that thermosetting sealing and finishing coating compositions do not adhere adequately to the conventional filler compositions and in many cases "crawling" and other film defects are found because of the poor wetting of the finish coats over such fillers.

Furthermore while filler compositions containing, as the vehicle, a thermosetting resin such as a phenol formaldehyde resin are an improvement over other conventional fillers with respect to adhesion thereto of the thermosetting sealing and finishing coatings, such filler compositions lack the application properties of other conventional fillers in that they harden or set too rapidly to permit rubbing or wiping off of excess filler within a reasonable time of fifteen minutes to four hours after application of the filler. Rubbing or wiping is required to pack the filler into the wood pores in addition to removing the excess quantity of filler but the rapid setting of filler composition containing only pigment matter, thermosetting resin and solvent preclude satisfactory rubbing because in drying the cohesion property of the composition rapidly exceeds its adhesion to the wood surfaces whereby rubbing causes a major amount of the filler to be pulled out of the wood pores.

It has now been found that the addition of a non-volatile oil, such as mineral oil or a saturated or unsaturated fatty oil to a filler composition comprising a thermosetting resin whose hardening is promoted by acidic hardening agents, pigment matter and volatile solvent unexpectedly yields a sealing composition having good adherence to wood surfaces and to superimposed coatings of thermosetting resins combined with good application and rubbing properties, despite the fact that many thermosetting resins used in admixture with fatty oils to make the filler compositions are not soluble or compatible with fatty oils. This is particularly true in the instance of thermosetting resins or low molecular weight which are water-soluble, but only partly soluble or even insoluble in organic solvents such as aliphatic and aromatic hydrocarbons ethers, alcohols and esters of the lower fatty acids.

While non-water soluble types of thermosetting resins can be used in admixture with fatty oil and pigment matter in the preparation of filler composition having good adherence to wood and superimposed thermosetting sealing and finish coatings, they do not have as good rubbing or wiping off properties as those filler compositions prepared with the water-soluble types of thermosetting resin since the former tend to exhibit some tack on drying. In both instances however, the presence of fatty oil in the composition yields definite application advantages over thermosetting filler composition devoid of fatty oil. Apparently the presence of fatty oil materially reduces cohesion and increases adhesion of the filler compositions to wood surfaces.

The amount of non-volatile oil required in the filler compositions for good application and rubbing properties is dependent upon the amount of pigment matter present. Usually the pigment matter in filler composition is present in high concentration to fulfill the function of pore and grain filling, and the amount of non-volatile oil that can be incorporated with good rubbing results has been found to be limited to a quantity not in excess of the oil-absorption value of the oil for the particular pigment matter in the composition. Excess quantities of non-volatile oil above the oil absorption value have been found undesirable for several reasons, namely, when applied to wood surfaces the oil sweats out and causes poor adherence of the superimposed sealing and finish coatings, and in filler compositions containing aqueous solutions of thermosetting resins, the oil and resin quickly separate after preparation of the filler composition, forming a two layer system, unless emulsifying agents are used to produce a stable emulsion. But by restricting the quantity of oil present in the filler composition to an amount less than the oil absorption value of the pigments therein, the oil is apparently so completely absorbed by the pigment particles that it cannot separate out as a distinct phase when in admixture with aqueous solutions of normally oil-incompatible thermosetting resins.

The kind of non-volatile oil used in the filler composition is not critical, as to its effect on application properties of the filler composition to wood surfaces or to its adherence properties. It has been found that any fatty oil can be used satisfactorily. Fatty oils are customarily classified in three major groups namely fatty drying oils exemplified primarily by tung oil, linseed oil and oiticica oil, semidrying oils such as soya bean oil, fish oils, cotton seed oil, corn oil, rape oil, wheat oil; and non-drying oils such as castor oil, olive oil, rice oil, grapeseed oil, and hazelnut oil. Any of the fatty oils in the aforementioned classes can be employed in the raw, heat-bodied blown or partially polymerized condition providing they are in liquid form. The fact that mineral oils can be successfully used in making useful filler compositions is indeed surprising, since practically all thermosetting resins are incompatible with mineral oils. A possible explanation for the utility of mineral oils in the filler compositions is that they function in essentially a physical manner in eliminating or substantially reducing the normal tackiness or cohesion of synthetic resins developed during volatilization of solvent, but without impairing their adhesion to wood surfaces and subsequently applied coatings, because the oil is all absorbed by the pigment matter present in the filler composition.

With fatty oils of drying and semi-drying character, conventional drier metals in the form of their soluble salts, the naphthenates, linoleates, and resinates such as lead, cobalt, manganese, iron and zinc can be added to the composition for the purpose of catalyzing the drying of these oils. However the presence of drier metals in the filler composition is not absolutely essential.

The acid-hardening thermosetting resins which can be used as the major binder component of the filler compositions include water soluble and organic solvent soluble phenol aldehyde resins, urea-formaldehyde resins and melamine-formaldehyde resins. The resins can be either liquid or solid types providing they are soluble in some volatile solvent. Furthermore the thermosetting resins can be modified in part by the addition of compatible natural and synthetic resins, for instance rosin, ester gums, dammar, copals, fatty oil and fatty acid modified alkyd resins, and inherently drying oil-soluble phenol-aldehyde resins. The amount of modifying resin which can be present in the filler compositions is limited to a quantity which will not so dilute the thermosetting resin as to prevent it from heat hardening to a condition where it is insoluble in aliphatic alcohols and esters.

The filler compositions require volatile solvent to reduce the viscosity of the composition to a suitable consistency depending upon the means used for applying the composition to wood surfaces; higher viscosities being suitable for brushing and dipping applications and lower viscosities for spraying means. The volatile solvent must necessarily be one which is a solvent for the thermosetting resin. Water is a preferred solvent when the particular thermosetting resin is soluble therein because water is odorless, economical, safe, readily wets wood surfaces, and does not evaporate too quickly. Organic solvents as a class are less desirable because many are toxic, inflammable, evaporate too quickly to allow for an extended period in which wiping can be carried out smoothly and, furthermore increase the cost of the filler compositions. High boiling organic solvents which are at least partly water-miscible are useful however for delaying the drying of the filler compositions after application to wood surfaces for periods up to four hours. The water-miscible organic solvents found most useful for this purpose are the glycols and their mono and diether derivatives, for instance ethylene, diethylene and triethylene glycols, propylene and dipropylene glycols, and their ether derivatives such as ethylene glycol monoethyl ether, ethylene glycol monobutyl ether, diethylene glycol mono-methyl ether, diethylene glycol monoethyl ether, diethylene glycol monobutyl ether, ethylene glycol diethyl ether, diethylene glycol diethyl ether and diethylene glycol methyl (n) butyl ether.

Any of the pigments used in conventional wood fillers may also be used in the thermosetting filler compositions of the present invention. Such pigments include synthetic pigments as well as the earth colors for instance iron oxides, umbers, siennas, the various carbon blacks, lead oxides and carbonates, zinc oxide, titanium oxide, ultramarine blues, chrome green and chromium oxide. The foregoing pigments illustrate typical pigments of appreciable color or tinctorial value. Inert or extender pigments are also used in filler compositions to reduce the cost of the product and to supply bulk. Exemplary inert pigments are the siliceous pigments, as silex and infusorial earths, gypsum, terra alba, barytes, blanc fixe, barium carbonate, clay, asbestine, whiting and marble dust.

The filler composition having the most practical application properties, namely, ease of wiping and good filling of wood pores and grain are those comprising as parts by weight, 70 to 90 parts of thermosetting resin solids for 10 to 30 parts of fatty oil, and 70 to 90 parts of pigment matter for 10 to 30 parts of total vehicle binder solids consisting of the oil and thermosetting resin. Formulations coming within these limits are predicated upon the use of pigments having an oil absorption value by the spatula rubbing method (number of pounds refined linseed oil to form a paste with 100 pounds of dry pigment) of about 50 or less. Pigments having a higher oil absorption value than 50 for instance ortho toner (90% orthoanisidine on Lake base), carbon blacks and lamp blacks can tolerate more oil than the proportions previously given without danger of sweat out on wood or separation into phases of the packaged filler compositions.

The amount of volatile solvent required in the filler compositions is generally between 25 to 40% of the total weight, the precise amount required depending upon the viscosity desired. Such viscosity adjustments are easily determined by preparing pilot batches and adding solvent until the desired viscosity is obtained, and then using the same proportions for production batches.

The filler compositions are applied to wood surfaces by brushing, spraying or dipping. Within a short time after coating, when a considerable amount of the volatile solvent has evaporated, the excess filler is removed by rubbing or wiping off the wood surface with a rag, towel, excelsior, steel wool or by a rubber squeegee. In contradistinction to conventional filler compositions, it is not necessary, with the thermosetting filler composition to wait several hours before applying topcoats of sealer coating and finish coating, for the subsequent coating can proceed immediately after wiping. Thus after a thermosetting sealing coating has been applied to the filled wood, both coatings can be air dried, forced dried or baked until the thermosetting resin components of both the filler composition and the sealing coating have been converted to at least a condition insoluble in aliphatic alcohols. Air drying and force drying of the coatings are promoted by acidic hardeners particularly the mineral acids, and salts, such as sulphuric acids, hydrochloric acid, phosphoric acid, ammonium chloride and other acid chlorides and sulphates. While the acidic hardening agents may be directly incorporated in the thermosetting filler composition, the disadvantages such as poor package stability and increased viscosity directly affecting the ease of application ordinarily do not warrant such direct addition. Instead, it has been found more satisfactory to add enough additional acidic hardener to the thermosetting sealing coating or finish coating to provide for the hardening requirements of the thermosetting resin in the filler composition.

The function of the sealing coating is to form a continuous coating over the wood after its pores have been filled, thereby completely sealing its surface. After the sealing coat has been applied and converted to an alcohol insoluble condition by prolonged air drying or more rapidly by force drying or baking at temperatures between 50° C. and 80° C., one or more finish coatings are applied and then air dried or baked to enhance the depth of finish and protection against abrasion, weathering, water and solvents. The optimum finishing coatings are those containing thermosetting acid hardening resins particularly thermosetting phenol-formaldehyde resin prepared by reacting phenol with excess molar quantities of formaldehyde in the presence of an alkaline catalyst. These resins yield finishes characterized by luster, hardness, toughness, resistance to abrasion, solvents and of good overall adhesion to the sealing coating, the filler composition and the wood surface.

Preparation of the thermosetting filler composition is essentially a simple process of mixing together all the components using ball or pebble mills, pony mixers, roller mills or any other paint mixing equipment adapted for dispersing pigment matter. Either all components of the filler composition can be mixed together at one time, or the pigment matter can be initially dispersed in oil and enough volatile solvent for the oil to form at least a wet pasty mass, and then adding the thermosetting resin component. Both procedures have been found to produce filler compositions having equivalent application properties and adherence to superimposed thermosetting coatings.

Figure 1:
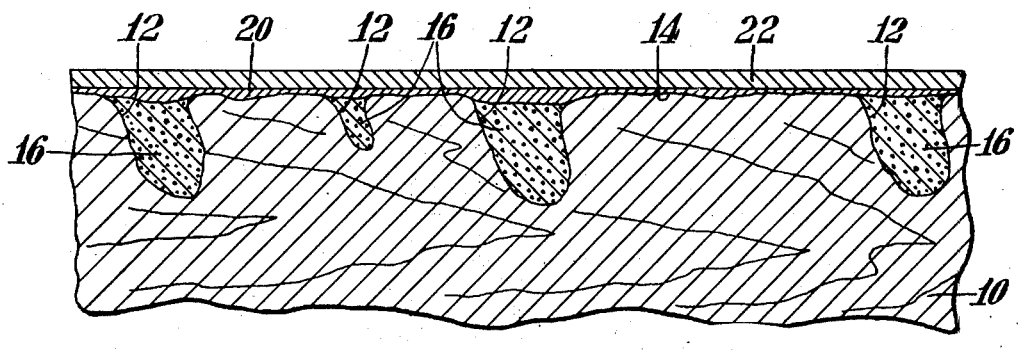
Figure 1 is a diagrammatic greatly enlarged, side elevation of a filled and coated surface of a wood base.

The enlarged section of a wood base 10 illustrated in Figure 1 shows the typical pores 12 and grain 14 of a wood surface. These depressions have been filled in, as by wiping, with a thermosetting filler composition 16 of the type herein described. A sealer coating 20 of thermosetting resin has been applied over the filler composition 16, and superimposed over the sealer coating 20 is a finish coating 22, also preferably of a thermosetting type.

Figure 2:
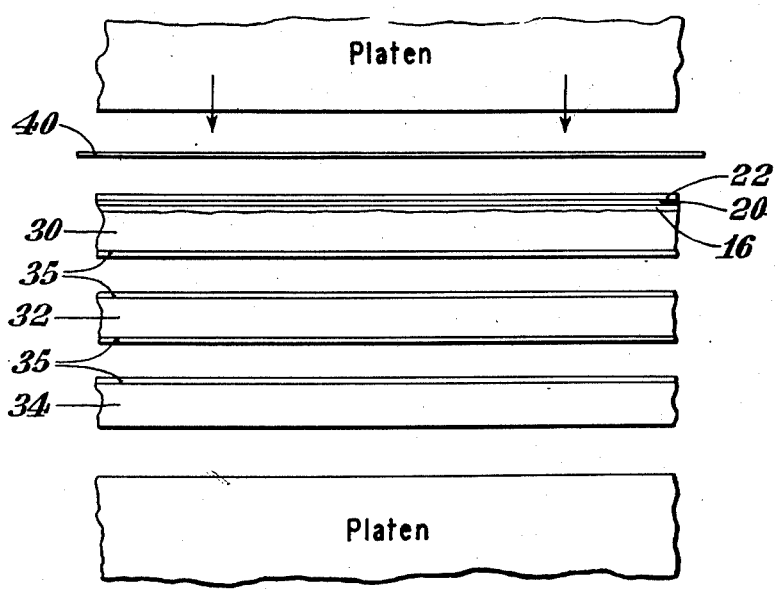
Figure 2 is a diagrammatic side elevation of a method and an apparatus for simultaneously heat-converting during a pressure molding operation the adhesive in a laminated structure of wood plies, as well as a thermosetting filler composition and superimposed coatings applied to one of the wood plies.

The method of simultaneously laminating wood plies and heat-converting a coating system applied to one of the exterior wood plies is illustrated by Fig. 2 which shows diagrammatically the relative positions of several wood plies 30, 32, 34 as they are stacked between press platens preliminary to the pressing operation. Adjacent faces of each wood ply 30, 32, 34 have been previously coated with an adhesive 35, such as a thermosetting resin. One of the exterior wood plies 30 has had its exposed face coated by being filled with a thermosetting filler composition 16, as herein described, over which is a thermosetting sealer coating 20, and superimposed over the latter is a thermosetting finish coating 22. A sheet of cellophane 40 or similar non-porous sheeting is interposed between the coated surface of the exterior ply 30 and a press platen to prevent adhesion of the coatings to the press platen surface during the heat-curing operation. The cellophane sheet can be readily removed, however, when the resin surface has been heat-hardened. During the pressing operation sufficient heat is imparted to the wood plies from the heated press platens to simultaneously heat-convert into an insoluble condition, the thermosetting resins present in the adhesive, the filler composition, the sealer coating and the finish coating.

Specific illustrations of what are now considered preferred coating procedures and filler compositions are as follows, all parts given being by weight.

*Example I*

A filler composition was prepared by mixing together to a smooth liquid consistency the following ingredients:

| | Parts |
|---|---|
| Raw linseed oil and driers [1] | 8 |
| Burnt umber | 10 |
| Domestic terra alba | 20 |
| Asbestine | 20 |
| Silica (amorphous or crystalline) | 110 |
| Water | 10 |
| Ethylene glycol monoethylether | 25 |
| 50% aqueous solution of ureaformaldehyde resin [2] | 64 |

[1] The drier content of the linseed oil consisted of the naphthenates of the following metals:
1.0% lead, as metal, based on the weight of oil
0.5% cobalt, as metal, based on the weight of oil
0.05% manganese, as metal, based on the weight of oil

[2] The urea-formaldehyde resin was a low temperature reaction of one mol urea and 3 mols formaldehyde (as formalin). The viscosity of the 50% aqueous solution was about 30 to 50 centipoises at 25° C. and its specific gravity was 1.200 at 25° C.

The filler composition after further reduction to desired viscosity with water was applied to mahogany panels, and could be wiped smoothly for up to 30 minutes after application. Prolonged drying of the filler composition for 4 to 6 hours prevented rubbing off the excess filler because the composition had dried too hard, however by merely wetting the wood surface with water, the composition softened sufficiently to permit normal wiping to be carried out. Pigmented or clear top coats of acid-hardening thermosetting resins applied over the filled woods adhered strongly to the wood surface and filler after baking for one hour at 60° C.

Substituting an equivalent quantity of diethylene glycol for ethylene glycol monoethyl ether of Example I yielded a filling composition having about the same drying time during which rubbing could be done, but which was even easier to rub.

Example II

A filler composition containing a water-soluble melamine formaldehyde resin was prepared by mixing together in a pony mixer the following ingredients:

| | Parts by weight |
|---|---|
| Burnt umber | 5 |
| Silex | 75 |
| Raw linseed and driers | 4 |
| 37% aqueous hydrochloric acid | 1.1 |
| Diethylene glycol | 13.7 |
| Ethylene glycol monoethyl ether | 13.7 |
| Water | 20.0 |
| Powdered water soluble melamine-formaldehyde resin [1] | 16.0 |

[1] This resin is the fusible dehydrated condensation product of 1 mol melamine and about 6 mols formaldehyde (as formalin) in aqueous alkaline solution and consists essentially of a mixture of mono, di, and trimethylol melamines.

The above composition thinned with water to desired consistency was applied by brushing to mahogany panels and was easily wiped with a cloth to remove excess filler after 10 minutes' air drying. The panels were then coated with sealing composition consisting of a water insoluble, acid hardening thermosetting phenol-formaldehyde resin (alkaline catalyzed condensation product of 1 mol phenol and 2 mols formaldehyde) dissolved as a 50% solution in a mixture of ethyl and amyl alcohols, the solution containing sulphuric acid as an acid hardener for the resin in amount equivalent to 2% on the weight of the resin solids, and ground silica-gel as a flatting agent in amount equivalent to 15% on the weight of the resin. The sealer coating was air-dried for 20 minutes and then baked for one hour at 60° C. converting the sealer coating to an acetone insoluble condition. A clear topcoat or finish coat of the same phenol formaldehyde resin in solution, but with omission of the flatting agent was then applied; air dried for 30 minutes and then baked for one hour at 60° C. The resultant coating structure was hard and tough, each layer adhering tightly to the other layers and the coating structure as an overall unit adhering strongly to the wood surface. The coating was resistant to water and organic solvents particularly acetone which left as a puddle on the surface did not soften the finish when finally evaporated.

Example III

A thermosetting filling composition containing a water-soluble, acid hardening thermosetting phenol-formaldehyde resin was prepared by mixing together the following ingredients:

| | Parts |
|---|---|
| Burnt umber | 5 |
| Silex | 75 |
| Raw linseed oil and drier | 4 |
| Diethylene glycol | 13.7 |
| Ethylene glycol monoethyl ether | 13.7 |
| Water | 20 |
| Water-soluble phenol-formaldehyde solution [1] | 22.9 |

[1] The water soluble phenol-formaldehyde resin was prepared in accordance with the description given in Meharg U. S. Patent No. 2,190,672. The aqueous resin solution had a specific gravity of 1.200 at 25° C., a viscosity of 80 centipoises at 25° C. and a solids content of 72%.

This filling composition had good application properties and exhibited satisfactory adherence to superimposed coatings of acid-hardening thermosetting resins, particularly when used in conjunction with sealer and top coatings of the kind described in Example II.

Example IV

A liquid thermosetting filling composition containing a thermosetting acid-hardening resin insoluble in water but soluble in organic solvents such as alcohols, glycols and their ethers was prepared by mixing together the following ingredients:

| | Parts |
|---|---|
| Burnt umber | 5 |
| Silex | 75 |
| Raw linseed oil and driers | 4 |
| Butyl alcohol | 15 |
| Ethylene glycol monobutyl ether | 15 |
| 10% aqueous sulphuric acid | 2 |
| 50% solution of thermosetting phenol-formaldehyde resin in a mixture of ethyl and amyl alcohols [1] | 32 |

[1] This resin solution was identical to the sealing resin solution described in Example II.

The above described sealing composition after application to open grained wood was easily wiped after a 10 minute air-dry evaporation period. The adherence of superimposed thermosetting coating materials to the filler composition of this example was tested in the same manner described in Example II and was found to be satisfactory in all respects.

While the phenolic type of top coatings have been found to yield the best finishes over the thermosetting filler composition as respects hardness, resistance to heat, water and solvents, other acid-hardenable thermosetting coating can also be used; particularly the alcohol soluble urea-formaldehyde resins such as those prepared by reacting urea and formaldehyde in the presence of butyl alcohol or octyl alcohol as described in the U. S. Patents Nos. 2,019,865 and 2,191,957. Alcohol soluble melamine formaldehyde resins are prepared in a similar manner, and they as well as the alcohol soluble urea-formaldehyde resin can be plasticized with fatty oil and fatty acid modified alkyd resins. Phosphoric acid in small quantities is usually added to these resins to accelerate their heat hardening.

Example V

A thermosetting acid-hardenable sealer coating was prepared by mixing together the following ingredients:

| | Parts |
|---|---|
| Fatty acid modified polyester resin, 50% solution in a mixture of xylol and butanol [1] | 80 |
| Xylol | 29 |
| Butanol | 29 |
| Ester gum modified phenol formaldehyde resin (melting point by ball and ring method, 132° C. and soluble in toluol) | 10 |
| Toluol | 10 |
| Butanol modified urea-formaldehyde resin solution [2] | 91 |
| 85% phosphoric acid which yielded a clear viscous liquid having 40% nonvolatiles, a viscosity of 90 centipoises at 25° C., and a pH of 1.95 at 25° C | 3.2 |

[1] The polyester resin was prepared in accordance with the description given in Butler U. S. Pat. 2,397,240.
[2] The water-white alcohol soluble urea formaldehyde resin solution had a nonvolatile content of 55% and a volatile content of 30% butanol and 15% xylol; it had a viscosity of 200 centipoises at 25° C.

This sealer composition was brushed onto wood surface filled with the filler composition described in Example I. The coating was then baked for one hour at a temperature of 60° C. On cooling, the coating system was tested for adherence and found to be excellent to both the wood surface and the filler. The coating was also resistant to acetone, alcohols and their fatty acid esters.

Substituting other fatty oils for raw linseed oil in the thermosetting filling compositions described in the previous examples gave no noticeable difference in the setting time of the filler compositions after application to wood surfaces, and all were about uniformly equal with respect to ease of wiping off excess fillers. Specifically, raw tung oil produced a slight tack in the filler compositions; dehydrated castor oil, soya bean oil, coconut oil, and mineral oil (essentially aliphatic in character; specific gravity 0.857 at 25° C.; viscosity 28 centipoises at 25° C.) were indistinguishable in application properties from the linseed oil containing composition. Alkali refined fish oil in a filling composition did not brush into the wood pores as easily as the others, but uniform filling resulted on wiping. All of these sealing compositions containing the various oils bonded satisfactorily to superimposed thermosetting coatings.

The coating systems comprising thermosetting resin containing filler compositions, sealer coatings and top or finish coatings successfully pass at least 20 cycles of a standard cold check resistance test consisting in first conditioning coated wood test panels by lightly abrading the finish with No. 400 grain abrasive paper, then polishing with rubbing and polishing compounds. The panels are then subjected to a hot-cold cycle consisting of one hour in a ventilated oven at 48° C. followed by one hour in a cold box maintained at —21° C. and then repeating the hot and cold exposures for 20 cycles. No checking failures were observed on any of the panels filled, sealed and coated in accordance with the descriptions given in the various examples.

It is of interest to note that the aforedescribed filling compositions while affording good adherence to superimposed coatings of thermosetting resins are not as adherent to superimposed coatings formulated with thermoplastic type resins such as oleo resinous varnishes, nitrocellulose and cellulose acetate lacquers, and vinyl polymers. Furthermore the best adherence to superimposed top coatings and smoothness of the ultimate finish are obtained when such coatings are formulated with substantially non-water soluble acid hardenable thermosetting resins which are soluble in organic solvents rather than with the water-soluble types of thermosetting resins which however are preferred in the filling compositions.

Another application of the herein described thermosetting filling compositions is with respect to the manufacture of plywood. Normally plywood structures are prepared by hot pressing together the individual wood plies whose opposing surfaces have been coated with thermosetting adhesive such as a urea-formaldehyde resin or a phenol-formaldehyde resin. After the plies have been pressed into a unitary structure, the outer surfaces of the plywood are then conventionally filled, sealed and top coated to obtain a smooth coating. This system involves several operations. It has now been found that the plywood pressing or bonding operation can be combined with the filling and sealing coating heat-conversion step when use is made of the filling compositions of the present invention whereby the heat conversion of the filler and sealing structure and the bonding agent are conducted simultaneously.

For example the top panel in a stack of individual wood panels is coated with any of the thermosetting filling compositions described herein. The excess filler is then wiped off and a thermosetting, acid hardenable sealing coating such as is described in Example II, is then applied to the filled wood surface and permitted to air dry for 20 minutes, or until non-tacky. A sheet of cellophane or similar smooth non-porous sheeting which is non-adherent to heat-converted thermosetting resin is when placed over the coated wood surface. The cellophane covered wood panel is placed in a steam heated press on top of the remaining plies and the press then closed, to subject the stack of wood plies to a pressure of about 200 p. s. i. and a temperature of 93° C. for 15 minutes. The panel is then cooled to about 40° C. for 5 minutes while held under pressure. After pressing the cellophane is easily stripped from the heat-hardened coated surface. The coated surface may then be given additional coats of thermosetting finish coating. Using a press having electrostatic heating means a pressure of about 70 p. s. i. was ample and heating for only 3 minutes at 82° C. was sufficient to heat convert the thermosetting resins in the filler composition and sealer coatings.

On plywood formed into curved shapes during the bonding operation, the combining of the filling and sealing operations therewith has been observed to minimize the tendency for grain splitting which often occurs on uncoated wood plies when so shaped during the bonding operation.

In the appended claims, the term non-volatile oil is intended to include fixed oils of animal, fish and vegetable origin and mineral oils derived from petroleum.

What is claimed is:

1. Method of filling and coating wood surfaces which comprises filling the wood pores and grain with a thermosetting filling composition containing pigment matter, non-volatile oil in amount not exceeding the oil absorption value of the pigment matter, a thermosetting resin insoluble in fatty oils and a volatile solvent for the resin, wiping off the excess filling composition, then applying a sealer coating comprising a thermosetting resin in solution in a volatile organic solvent to the filled wood surface, and then heat-converting both the filler composition and the thermosetting sealer coating to at least an alcohol-insoluble condition.

2. Method of filling and coating wood surfaces as defined in claim 1, whereby the heat-converted filler and sealer coating are then further coated with a heat-convertible resin in solution in an organic solvent and baked again to heat-convert the latter coating to an acetone-resistant condition.

3. A wood base having a heat-converted filler in its pores and grain comprising a mixture of pigment matter, non-volatile oil in amount not exceeding the oil absorption value of the pigment matter, and thermosetting resin insoluble in said oil, and at least one superimposed coating of heat-converted thermosetting resin, said filler and superimposed coating being intimately bonded to each other and to the wood base.

4. A wood base having a heat-converted filler in its pores and grain comprising a mixture of pigment matter, non-volatile oil in amount not exceeding the oil absorption value of the pigment matter and urea-formaldehyde resin insoluble in said oil, and at least one superimposed coating of acid-hardened thermosetting phenol-formaldehyde resin, said filler and superimposed coating being intimately bonded to each other and to the wood base.

5. Method of bonding and coating plywood structures, which comprises applying thermosetting adhesive to opposing faces of individual wood plies, filling the pores and grain of the wood ply forming the exterior surface of the plywood structure with a thermosetting filler composition comprising pigment matter, non-volatile oil in amount completely absorbed by the pigment matter, thermosetting resin insoluble in said oil and a volatile thinner for the resin, wiping off excess filler from the filled wood surface, applying a sealing coating solution of a thermosetting resin to the filled surface, then covering the coated surface with a non-porous sheeting which is non-adherent to the thermosetting resin in the sealer solution when heat-converted, assembling the individual plies into a stack with the coated ply positioned as an outer layer in the stack, then subjecting the stack to heat and pressure to simultaneously heat-convert the adhesive, filler composition and sealer coating.

6. A wood base having a heat-converted filler in its surface pores and grain, said filler comprising a mixture of 70 to 90 parts by weight of fatty oil insoluble thermosetting resin solids, 30 to 10 parts of a non-volatile oil, 70 to 90 parts of pigment matter having an oil-absorption value of up to 50 per 30 to 10 parts total resin solids and non-volatile oil, and at least one superimposed coating of heat-converted thermosetting resin, said filler and superimposed coating being intimately bonded to each other and to the wood base.

KENNETH VERNON McCULLOUGH.
LEWIS DONALD MAINES.

REFERENCES CITED

The following references are of record in the file of this patent:

UNITED STATES PATENTS

| Number | Name | Date |
|---|---|---|
| 1,019,408 | Baekeland et al. | Mar. 5, 1912 |
| 1,997,803 | Miller | Apr. 16, 1935 |
| 2,153,660 | Clapp | Apr. 11, 1939 |
| 2,208,290 | Glycofrides | July 16, 1940 |
| 2,292,468 | Oeffinger et al. | Aug. 11, 1942 |
| 2,321,937 | Quinn | June 15, 1943 |
| 2,394,498 | Waldie | Feb. 5, 1946 |
| 2,419,614 | Welch | Apr. 29, 1947 |